United States Patent
Yamasaki et al.

(10) Patent No.: US 7,198,415 B2
(45) Date of Patent: Apr. 3, 2007

(54) OPTICAL RECEPTACLE TO ENHANCE COUPLING EFFICIENCY WITH OPTICAL PLUG MATED THEREWITH AND OPTICAL MODULE INSTALLING THE SAME

(75) Inventors: Yasuo Yamasaki, Kanagawa (JP); Hiromi Nakanishi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/198,275

(22) Filed: Aug. 8, 2005

(65) Prior Publication Data
US 2006/0045438 A1  Mar. 2, 2006

(30) Foreign Application Priority Data
Aug. 9, 2004 (JP) .............................. 2004-232642

(51) Int. Cl.
G02B 6/36 (2006.01)
(52) U.S. Cl. .......................................... 385/92; 385/88
(58) Field of Classification Search ............ 385/88–94, 385/139
See application file for complete search history.

(56) References Cited

U.S. PATENT DOCUMENTS 5,631,992 A * 5/1997 Takahashi et al. ............. 385/94
6,655,849 B1 * 12/2003 Malavieille et al. .......... 385/60

FOREIGN PATENT DOCUMENTS

| JP | 62-299091 A | 12/1987 |
| JP | 04-57381 A | 2/1992 |
| JP | 10-332988 A | 12/1998 |

* cited by examiner

Primary Examiner—Kevin S. Wood
(74) Attorney, Agent, or Firm—Venable LLP; Michael A. Sartori; Steven J. Schwarz

(57) ABSTRACT

The present invention provides an optical receptacle that reduces the fluctuation of the optical coupling efficiency with the optical plug. The optical receptacle of the invention comprises a stub with a filler therein and a sleeve assembly to receive the optical plug. The stub with a cylindrical shape has an opening in the side where the optical plug is to be in contact thereto and a bore in the other side. The diameter of the opening is comparable to that of the core of the external fiber, while the diameter of the bore is greater than that of the opening. The filler exposes in this opening to couple with the external optical fiber. Thus, the optical coupling efficiency between the filler and the external fiber may enhance and the fluctuation thereof due to the insertion/extraction of the optical plug can be reduced.

8 Claims, 4 Drawing Sheets

OPTICAL RECEPTACLE TO ENHANCE COUPLING EFFICIENCY WITH OPTICAL PLUG MATED THEREWITH AND OPTICAL MODULE INSTALLING THE SAME

BACKGROUND OF THE INVENTION

1. Field of the Invention

The present invention relates to an optical receptacle used in an apparatus or an optical communication and an optical module installing the optical receptacle.

2. Related Prior Art

Japanese Patent application published as H10-0882988 has disclosed an optical receptacle that provides a stub within which a coupling fiber is secured. Such optical receptacle is capable, by receiving a plug ferrule that also secures an optical fiber, of coupling optical fibers to each other.

However, such conventional optical receptacle uses the coupling fiber within the stub to transmit optical signals, in particular, the coupling fiber is often a single mode fiber to maintain the quality of the signal light, the tolerance for the optical coupling between optical fibers has to be severe. Accordingly; the optical coupling efficiency between the optical fiber and the device within the optical receptacle degrades as the number of the insertion/extraction of the connector plug increases. Moreover, when the connector plug is inserted into the receptacle to couple the optical fiber in optical to the device, the optical coupling efficiency between the plug and the device depends on the stress applied to the optical fiber, which is called as the wiggle characteristic. Thus, the optical output from the opal fiber engaged with the receptacle fluctuates.

Therefore, one object of the present invention relates to the optical receptacle that suppresses the fluctuation of the optical output from the optical fiber engaged therewith, and to the optical module installing such optical receptacle.

SUMMARY OF THE INVENTION

One aspect of the present invention relates to an optical receptacle that optically couples with a connector plug securing an external fiber with a core to transmit light. The optical receptacle comprises a sleeve assembly and a stub. The sleeve assembly receives the connector plug and has a cylindrical shape. The stub, secured within the sleeve assembly, also has a cylindrical shape with a bore. This bore is filled with filler to couple in optical with the external fiber, The finer of the invention may be made of material having a homogeneous refractive index comparable to that of the core.

Moreover, the bore of the stub has a first diameter in a side where the filler is to be optically coupled with the optical fiber and a second diameter in the other side thereof. The first diameter may be comparable to that of the core. Since the diameter of the bore, i.e., the diameter of the filler is widened in the other aide, not only the optical coupling efficiency between the filler and the core may be enhanced but a the fluctuation thereof due to the insertion/extraction of the connector plug may be reduced.

The stub may cover the filler in the side such that the stub provides an opening to expose the filler and forms in convex together with the filler. Since the filler is so processed with the stub, the external fiber may couple with the filler by abutting against the filler, which realizes the physical contact therebetween. Accordingly, the reflection of the light transmitted from the optical fiber, or from the filler, can be eliminated.

The other surface of the filler, together with the stub, may have an end surface, opposite to the side where the filler is to be optically coupled with the optical fiber, inclined to an a of the cylinder of the sleeve assembly. Accordingly, the light is not reflected to the incoming direction, which may stable the optical system providing the present optical receptacle.

Another aspect of the present invention relates to an optical module that comprises a semiconductor optical device, an optical receptacle described above, and a body. The semiconductor optical device may be a laser diode for the case that the optical module is an optical transmitting module or a photodiode for the case the optical module is an optical receiving module. The body encloses the optical device and installs the optical receptacle thereon. The body and the optical receptacle may form a cylindrical shape.

DESCRIPTION OF PREFERRED EMBODIMENTS

Next, preferred embodiments of the present invention will be described as referring to accompanying drawings.

Figure 1:
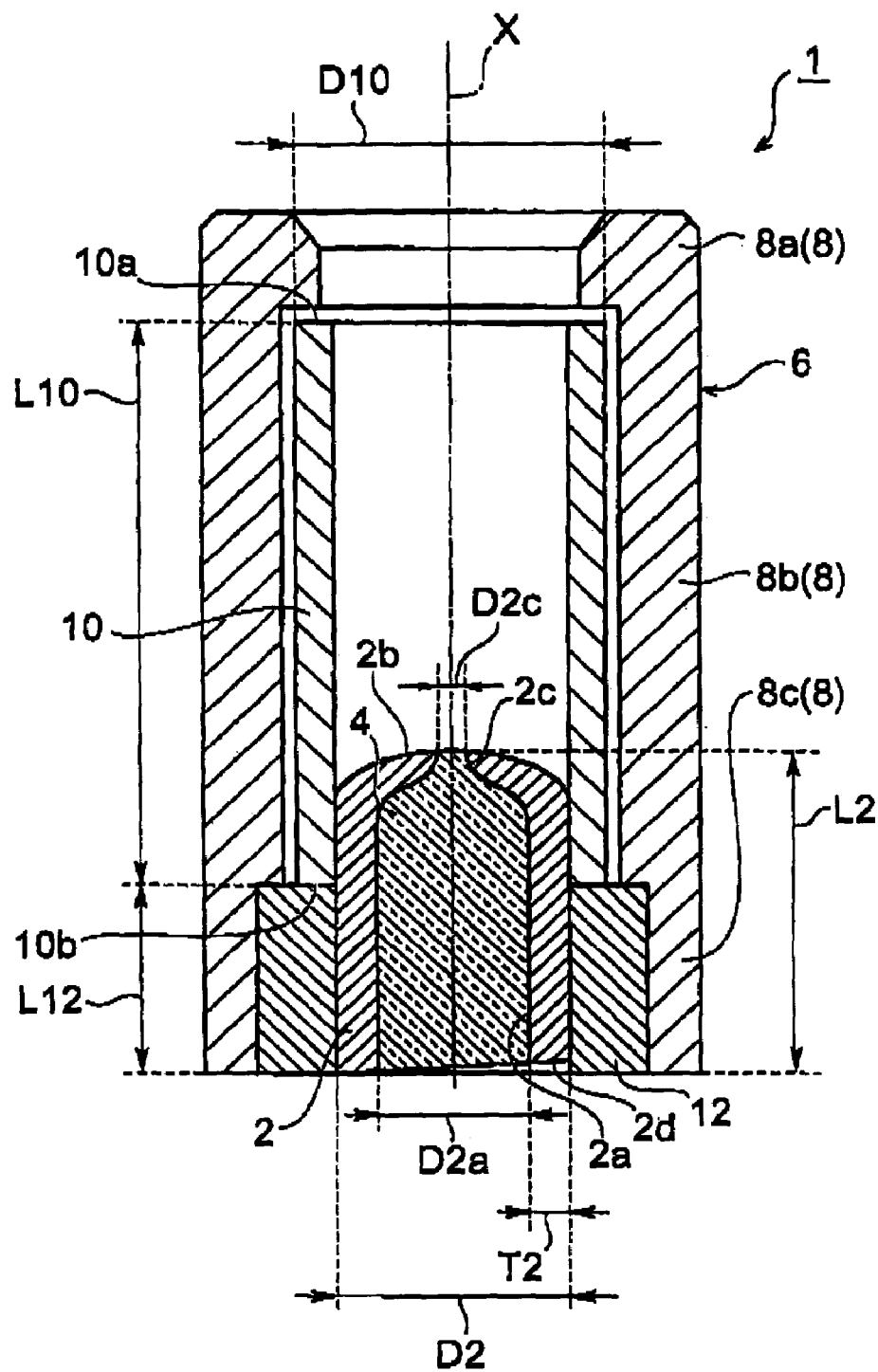
FIG. 1 is a cross section of the optical receptacle according to the present invention.
Figure 2:
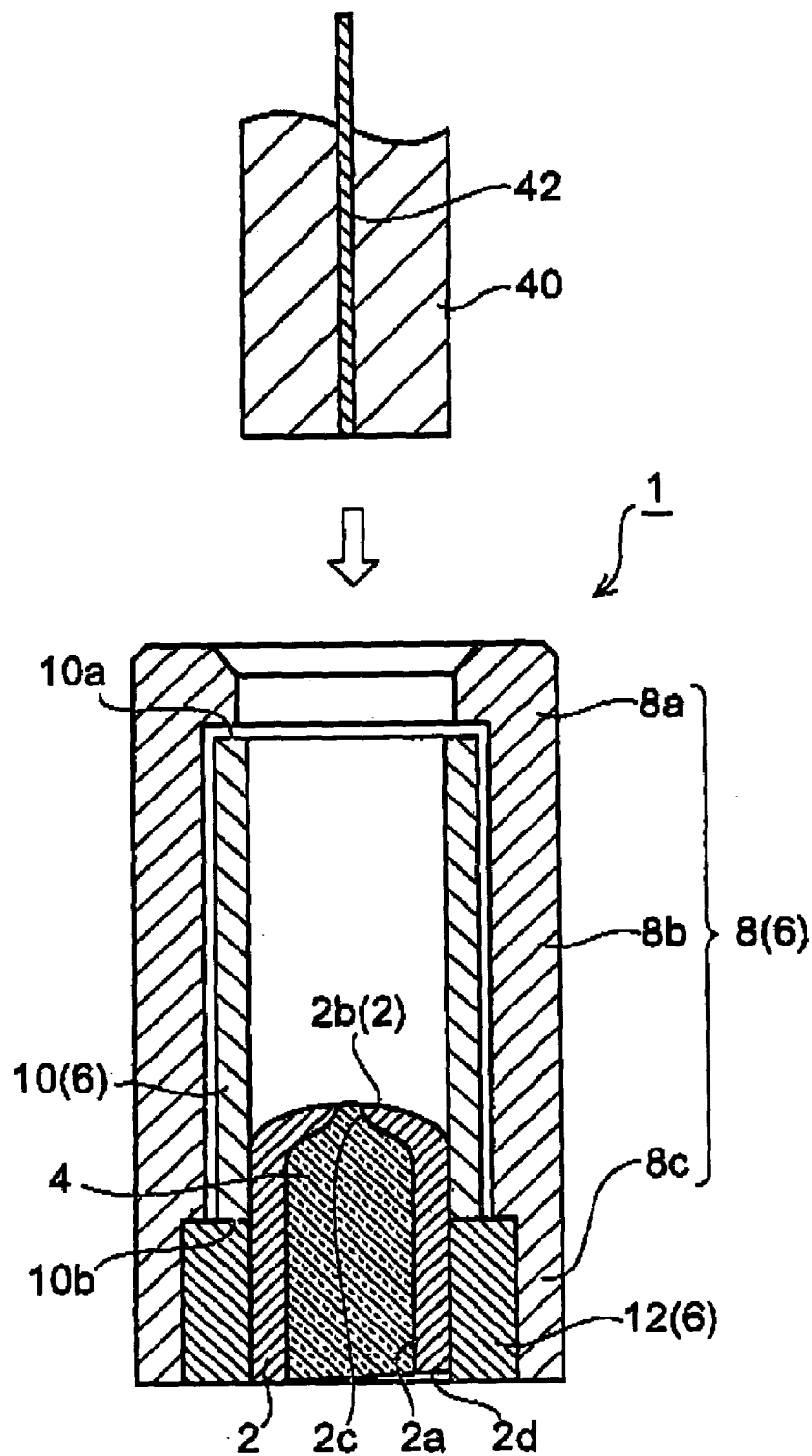
FIG. 2 is a cross section showing the optic receptacle of the invention to receive the optical plug.

FIG. 1 is a cross section of an optical receptacle according to one embodiments of the invention. FIG. 2 is a cross section illustrating the optical receptacle to be engaged with an optical plug. As shown in FIGS. 1 and 2, the optical receptacle 1 comprises a stub 2 with filler 4, and a sleeve assembly 6 that includes a sleeve cover 8, a sleeve 10, and a bushing 12.

The stub 2 is a cylindrical member with a bore 2a within which the filler 4 is filled. Specifically, the stub 2 is a cylindrical member extending along the axis X, which coincides with the optical as of the sleeve assembly 6, and provides the bore 2a, which also extends along the axis X, into which the filler 4 s filled. The stub 2 is made of stiff material such as ceramic and metal, typically zirconia. Accordingly, the physical dimension of the stub 2 can be accurately determined. When zirconia is applied or the stub 2, the injection mold may be used.

One end 2b of the stub 2, which is the front end thereof, forms an opening 2c continuing to the bore 2a. The diameter of the opening 2c is nearly same as that of the cladding of the optical fiber 42, which is 0.125 mm, of the opal plug 40 shown in FIG. 2 coming in physically contact thereto. The shape of the bore 2a of the stub 2 has a constant diameter $D2a$ from the other end 2d thereof, which is the rear end, to a portion close to the front end 2b, and gradually decreasing diameter from the portion to the front end 2b. The diameter at the front end 2b is denoted as $D2c$ in FIG. 1. The constant inner diameter $D2a$ is enough greater than that of the cladding of the external fiber 42. One exemplary dimension of the stub 2 is, 8 mm in the length L2, about 1.245 mm in an outer diameter D2, and about 0.65 mm in the inner diameter D2a.

The filler 4 fills in the bore 2a of the stub to and is made of material transparent or the light transmitted in the optical fiber 42 shown in FIG. 2 and with homogeneous refractive index in the bore 2a. In the present embodiment, a silica glass is applied. The silica glass has a refractive index substantially same as that of the core of the optical fiber 42. Accordingly, when the optical fiber 42 comes in physically contact to the filler 4, the reflection at the interface can be reduced. The filler 4 made of silica glass is filled within the bore 2b of the stub as they are melted. The filler 4 may be a resin or plastic depending of the type of the optical fiber 42.

The front end 2b of the stub 2 is polished to realize the physical contact (PC) against the optical fiber 42. Specifically, the front end 2b is polished, together with a portion of the filler 4 exposed in the opening 2c, in convex. The interface between the stub 2 and the filer 4 connect in smooth to each other at the front end 2b. Thus, when the optical fiber 42, which is also formed in convex in the tip thereof, abuts against the front end 2b of the stub, the optical fiber 42 can come in physic contact with the stub 2 and the filler 4, which prevents the light transmitted in the optical fiber 42 from being reflected at the interface between the optical fiber 42 and the filer 4.

The rear end 2d of the stub 2 is also formed to tilt by a preset angle against the axis X. The preset angle may be determined to reduce the light incident to the rear end 2d from the direction along the axis X and reflected thereat toward the axis X, which is typically greater than 4 degrees in the angle between the axis X and the normal of the rear end 2d. Another method to decrease the light reflected at the rear end 2d is that an anti-reflection coating (AR coating) with less than 1% reflectivity is provided on the rear end 2d.

The sleeve assembly 6 provides a function to engage the optical receptacle 1 with the external optical plug 40. The sleeve assembly 6 comprises the sleeve 10, the busing 12, and the sleeve cover 6, each having a cylindrical or tubular shape.

The sleeve cover 8 includes, from the front end thereof, an inlet portion 8a, a body portion 8b, and an end portion 8c having a diameter greater than that in the body portion 8b. The edge of the inlet portion 8a is chamfered to facilitate the insertion/extraction of the external optical plug 40. The sleeve cover may be made of metal such as SUS 303. When an adhesive is used to secure the sleeve cover with the other optical components, an epoxy-resin may be applied for the sleeve cover.

The sleeve 10 is disposed within the sleeve cover 8 and may be a split sleeve with a slit along the axis X. The front end 10a of the sleeve 10 receives the external connector plug 40, while the rear end 10b receives the front end portion 2a of the stub 2. The sleeve may be made of ceramic such as is aluminum oxide and zirconia, metal such as phosphor bronze, or resin. Exemplary dimensions of the sleeve are, about 5 mm in length L10, and about 1.3 mm in an outer diameter D10. The sleeve 10 is not restricted to the split sleeve shown in FIGS. 1 and 2, a rigid sleeve without any slit is applicable.

The bushing 12 is disposed in the rear end portion 8c of the sleeve cover to abut against the rear end 10b of the sleeve 10. The busing 12 is sandwiched between the sleeve cover 8 and the stub 2 to secure the stub 2 therein. The busing is made of metal such as SUS 303 and has a dimension of about 1 mm in the length L12 thereof.

The optical receptacle 1 mentioned above is manufactured as follows. First, the rear portion of the stub 2 with the filler 4 is press-fitted into the busing 12. Next, the stub 2, fitted with the bushing 12 and the front portion thereof is inserted into the sleeve 10, inserts into the rear portion of the sleeve cover 8 to press-fit the bushing 12 between the sleeve cover 8 and the stub 2.

The receptacle 1 thus assembled receives the external connector plug 40 within the sleeve 10 thereof to abut the optical fiber 42 against the stub 2 and the filler 4 exposed in the opening 2c. Since the filler is made of glassy material having the homogeneous refractive index and the diameter greater than that of the core of the external fiber 42, the external fiber 42 can get a wider tolerance for the optical coupling with the stub 2. Accordingly, the degradation in the optical coupling by the iteration of the insertion/extraction of the connector plug 40 can be suppressed. Moreover, even when the connector plug 40 is engaged with the optical receptacle 1 and an external stress is applied thereto along the diameter, the fluctuation in the optical coupling can be suppressed. The optical coupling loss between the connector plug 40 and the optical receptacle 1 can be reduced.

Since the filler 4 is secured within the stub 2, which is made of stiff material the filler 4 does not damage or crack compared as the case when the filler 4 is directory attached to the sleeve assembly with an adhesive. Only the opening 2c of the stub 2 exposes the surface of the filler 4, but the diameter of the opening 2c is comparable to that of the core of the external fiber 40, which prevents the exposed portion of the filler 4 from causing a crack or a scratch when the external connector plug is inserted therein. Thus, the degradation of the optical coupling efficiency due to the crack or the scratch can be released.

Figure 3:
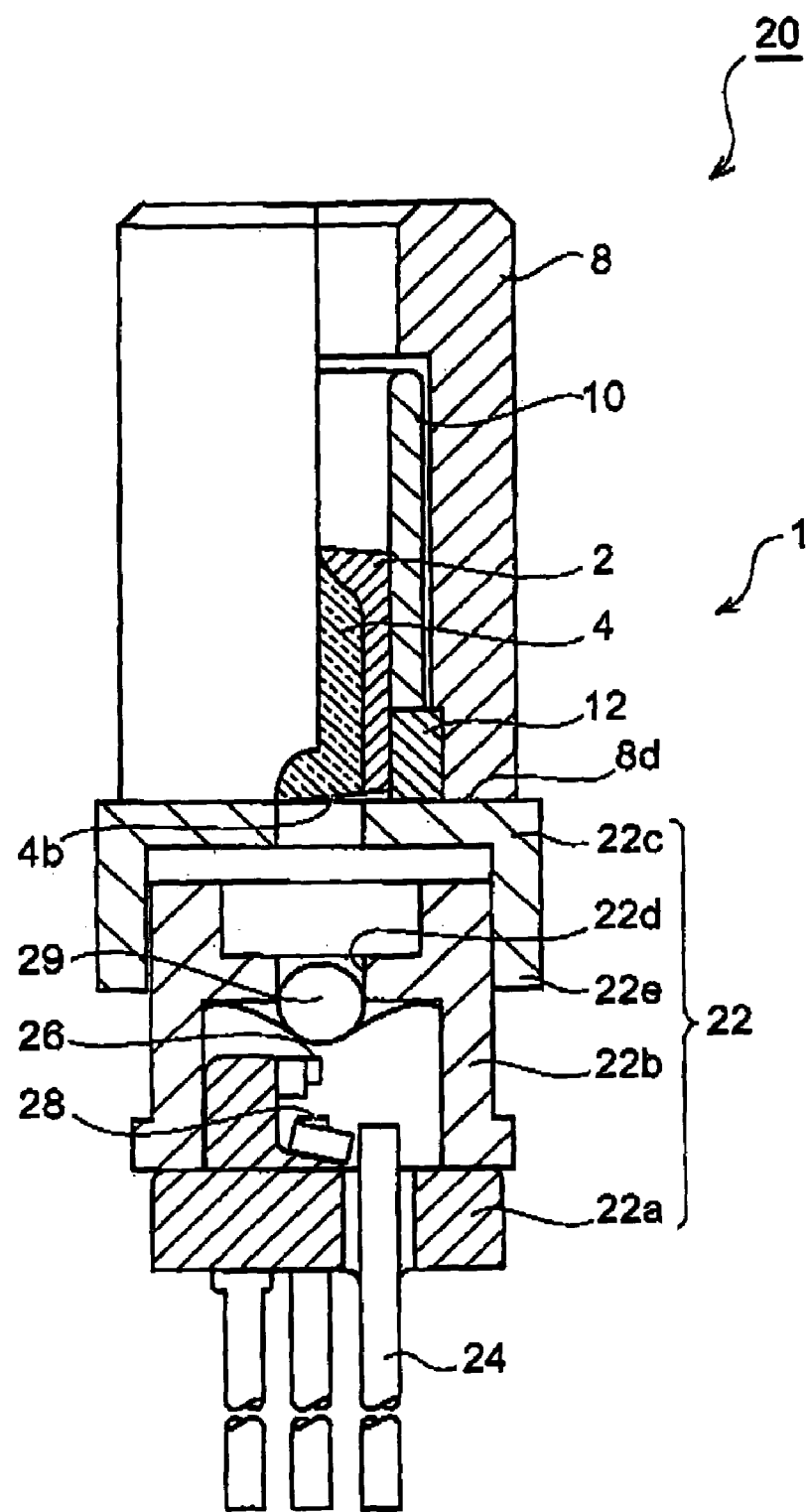
FIG. 3 is a cross section of the optical transmitting module providing the optical receptacle of the invention.

Next, an optical module installing the optical receptacle described above will be explained. FIG. 3 is a cross section showing the optical module 20 with the optical receptacle 1. The optical module 20 comprises the optical receptacle 1 and a body 22 arranged in the rear side of the optical receptacle 1.

The body 22 attaches the optical receptacle 1 in the sleeve cover 8 thereto. Specifically, the body 22 comprises a stem 22a, a cap 22b, and an alignment member 22c. The stem 22a includes a plurality of lead pins 24 and mounts a light-emitting device 26 and a light-receiving device 28 to monitor the light emitted from the light-emitting device 26. The devices, 26 and 28, are electrically connected to the lead pin 24. The light-emitting device may be a semiconductor laser diode, which has a type of the Fabry-Perot (FP) or the distributed feedback (DFB) and is made of InP compound semiconductor as a primary material. The light-receiving device 28 may be a PIN-photodiode made of InGaAs compound semiconductor as a primary material.

The cap 28 has an opening 22d in the top center thereof into which a condenser lens 29 is arranged to concentrate the light emitted from the light-emitting device 26. The lens 29 may be a spherical lens as shown in FIG. 3, or may be an aspherical lens.

The alignment member 22c has a side 22e with a bore, a diameter of which is comparable to the outer diameter of the cap 22b and into which the cap 22b is inserted. The alignment member 22c mounts the optical receptacle 1 onto the surface opposite to the side 22e. This surface is in contact with the rear surface 8d of the sleeve cover 8.

The optical module 20 thus configured provides the light-emitting device 26, and the light emitted from this light-emitting device 26 may be transmitted to the optical fiber 42 within the connector plug 40 via the filler 4 in the optical receptacle 1. Moreover, since the filler 4 has a large diameter, the inner diameter D2a of the stub 2, the light emitted from the light emitting device 26 enters in effective the external optical fiber 42 concentrated with the lens 29 and through the filler 4 with the relatively large diameter.

Figure 4:
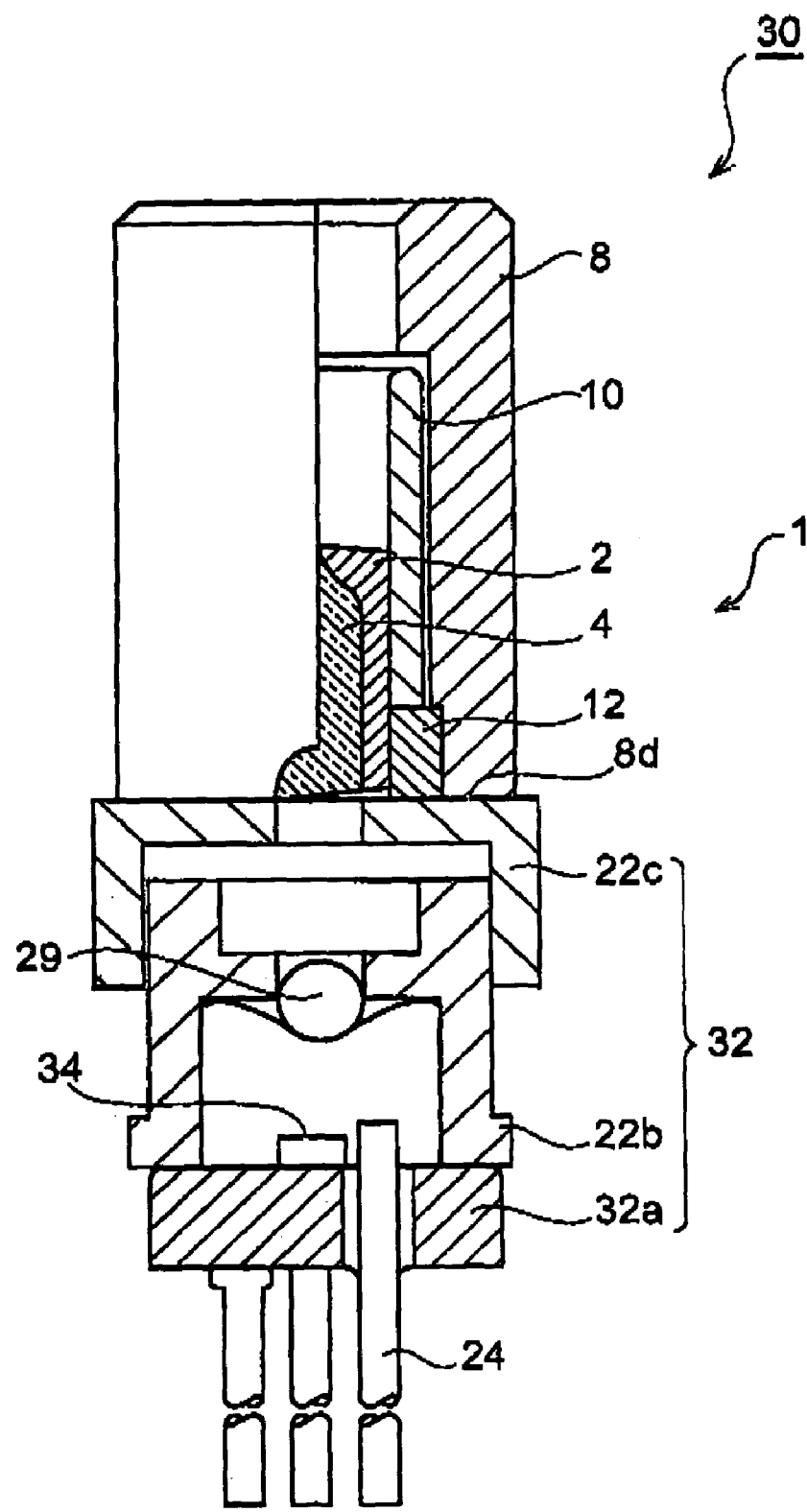
FIG. 4 is a cross section of the optical receiving module stalling the optical receptacle of the invention.

FIG. 4 is a cross section of a modified optical module 30 of the present invention. In the figure, the same elements are refereed by the same numerals as those in the previous embodiment shown in FIG. 3. As shown in FIG. 4, the optical module 30 comprises the optical receptacle 1 and the body 32 mounting the optical receptacle 1 thereon.

The body 32 has a stem 32a instead of the stem 22a in the previous embodiment shown in FIG. 3. On the stem 32a is disposed with a light-receiving device 34 that receives light passing through the filler 4 in the optical receptacle 4. The light-receiving device 34 may be a PIN-PD made of, for example, InGaAs compound semiconductor material. Thus, the light-receiving device 34 can receive the light emitted from the external fiber 42, which is secured in the optical plug 40 that engages with the optical receptacle 1, through the finer 4.

Thus, although the present invention is thus described as referring to accompanying drawings. However, the present invention is not restricted to those embodiments illustrated in the figures. For example, although the stub 2 has the opening 2c in the front side thereof to expose the filler 4 in the opening 2c, the stub 2 and the filler 4 has a cylindrical shape with a constant diameter. In this case, a protector preferably covers the front side of the filler 4 to escape from the scratch or the damage.

Moreover, the present receptacle 1 is applicable, in addition to the optical transmitting module and the optical receiving module described above, to the optical transceiver.

What is claimed is:

1. An optical receptacle to be optically coupled with a connector plug that secures an external fiber with a core to transmit light and a cladding surrounding said core, said optical receptacle comprising:
a sleeve assembly for receiving said connector plug, said sleeve assembly having a cylindrical shape; and
a stub secured within said sleeve assembly and having a front end and a rear end opposite to said front end, said stub having a bore filled with a filler and an opening with a diameter substantially equal to a diameter of said cladding of said external fiber to expose said filler at said front end, said bore having a constant diameter greater than a diameter of said cladding of said external fiber at a side of said rear end, said stub together with said filler forming a convex shape at said front end to have said filler in physical contact to said core of said external fiber,
wherein said filler is made of silica glass.

2. The optical receptacle according to claim 1, wherein said stub together with said filler has an end surface, at said rear end inclined to an axis of said sleeve assembly.

3. The optical receptacle according to claim 1, wherein said stub is made of zirconia ceramics or metal.

4. The optical receptacle according to claim 1, wherein said sleeve assembly includes,
a bushing for press-fitting a portion of said stub with said filler,
a sleeve engaged with a rest portion of said stub, and
a sleeve cover for securing said busing and for covering said sleeve, said busing being press-fitted between said sleeve cover and said stub.

5. An optical module to communicate in optical with an optical fiber secured within an optical plug, said optical module comprising:
a semiconductor optical device for optically communicating with said optical fiber;
an optical receptacle according to claim 1; and
a body for enclosing said optical device therein, said body including:
a stem for mounting said semiconductor optical device,
a cap with a lens in a center portion thereof for enclosing said semiconductor optical device together with said stem, and
an alignment member to optically align said optical receptacle with respect to said semiconductor optical device,
wherein said body mounts said optical receptacle thereon.

6. The optical module according to claim 5, wherein said semiconductor optical device is a semiconductor laser diode to emit light to said optical fiber through said filler.

7. The optical module according to claim 5, wherein said semiconductor optical device is a photodiode to receive light emitted from said optical fiber through said filler.

8. The optical module according to claim 5, wherein said sleeve assembly includes,
a bushing for press-fitting a portion of said stub with said filler,
a sleeve engaged with a rest portion of said stub, and
a sleeve cover for securing said bushing and for covering said sleeve, said bushing being press-fitted between said sleeve cover and said stub, and
wherein said one end of said bushing and one end of said sleeve cover are aligned with said rear end of said stub to mount said sleeve assembly onto said alignment member.

* * * * *